(12) United States Patent
Akamatsu et al.

(10) Patent No.: US 10,245,671 B2
(45) Date of Patent: Apr. 2, 2019

(54) WELD OVERLAY SYSTEM (71) Applicant: KAWASAKI JUKOGYO KABUSHIKI KAISHA, Kobe-shi, Hyogo (JP)

(72) Inventors: Masahiko Akamatsu, Himeji (JP); Shingo Yonemoto, Kakogawa (JP); Takanori Kozuki, Kakogawa (JP); Chiaki Ito, Miki (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 137 days.

(21) Appl. No.: 15/125,435

(22) PCT Filed: Mar. 6, 2015

(86) PCT No.: PCT/JP2015/001237
§ 371 (c)(1),
(2) Date: Sep. 12, 2016

(87) PCT Pub. No.: WO2015/136903
PCT Pub. Date: Sep. 17, 2015

(65) Prior Publication Data
US 2017/0072494 A1  Mar. 16, 2017

(30) Foreign Application Priority Data
Mar. 10, 2014  (JP) ................ 2014-045827

(51) Int. Cl.
*B23K 9/04* (2006.01)
*B23K 9/167* (2006.01)
*B23K 37/047* (2006.01)
*B23K 9/173* (2006.01)
(Continued)

(52) U.S. Cl.
CPC .............. *B23K 9/048* (2013.01); *B23K 9/167* (2013.01); *B23K 9/173* (2013.01); *B23K 9/296* (2013.01);
(Continued)

(58) Field of Classification Search
CPC ........ B23K 9/048; B23K 9/167; B23K 9/173; B23K 37/0229; B23K 37/0443; B23K 37/047; B23K 2201/06
(Continued)

(56) References Cited

U.S. PATENT DOCUMENTS 4,873,419 A * 10/1989 Acheson ................ B23K 9/048
219/125.1
4,892,990 A * 1/1990 Acheson ................ B23K 9/048
219/125.11
(Continued)

FOREIGN PATENT DOCUMENTS

JP   H05-177389 A   7/1993
JP   H07-256450 A   10/1995
(Continued)

OTHER PUBLICATIONS

Nov. 1, 2017 Office Action issued in Chinese Patent Application No. 201580010553.8.
(Continued)

*Primary Examiner* — Alexander M Valvis
(74) *Attorney, Agent, or Firm* — Oliff PLC (57) ABSTRACT

A weld overlay system includes a workpiece jig holding a workpiece in manner that the workpiece center axis direction is parallel to X-axis direction, and rotates the workpiece in circumferential direction, a carriage, welding base supported on the carriage in manner that the welding base is displaceable with respect to the carriage in Y-axis direction and Z-axis direction, at least one pair of rollers and welding torch are supported on the welding base, and like. Pair of rollers include rotary shafts extend in parallel with the X-axis and are spaced apart from each other in Y-axis direction. The rollers are pressed against portion of the workpiece above the workpiece center axis C. The welding torch is supported on the welding base in manner that
(Continued)

distances in Y-axis direction from the rotary shafts of the pair of rollers to the tip end of the welding torch are equal to each other.

5 Claims, 7 Drawing Sheets

(51) Int. Cl.
    *B23K 9/29*     (2006.01)
    *B23K 37/02*     (2006.01)
    *B23K 101/06*     (2006.01)

(52) U.S. Cl.
    CPC ........ *B23K 37/0229* (2013.01); *B23K 37/047* (2013.01); *B23K 2101/06* (2018.08)

(58) Field of Classification Search
    USPC .......................................... 219/76.14, 76.15
    See application file for complete search history.

(56) References Cited

U.S. PATENT DOCUMENTS

| | | |
|---|---|---|
| 5,545,873 A | 8/1996 | Sauer |
| 6,781,083 B1 | 8/2004 | Keller et al. |
| 7,180,028 B2 * | 2/2007 | Flood .................... B23K 9/0282 |
| | | 219/125.1 |
| 7,915,561 B2 * | 3/2011 | Kossowan ............. B23K 9/048 |
| | | 219/76.14 |
| 2014/0033535 A1 * | 2/2014 | Keefe .................... B23K 9/325 |
| | | 29/894.01 |
| 2015/0209913 A1 * | 7/2015 | Denney .............. B23K 35/0272 |
| | | 219/76.14 |

FOREIGN PATENT DOCUMENTS

| | | |
|---|---|---|
| JP | 2001-259835 A | 9/2001 |
| KR | 200415243 Y1 | 4/2006 |
| KR | 2012-0040939 A | 4/2012 |

OTHER PUBLICATIONS

Jun. 9, 2015 International Search Report issued in International Patent Application No. PCT/JP2015/001237.

Jun. 9, 2015 Written Opinion issued in International Patent Application No. PCT/JP2015/001237.

\* cited by examiner

WELD OVERLAY SYSTEM

TECHNICAL FIELD

The present invention relates to a weld overlay (overlay welding, build-up welding) system which weld overlays the outer periphery of a tube which is made of metal. More specifically, the present invention relates to a copying technique in the weld overlay system.

BACKGROUND ART

Conventionally, in order for a metal tube to have desired surface characteristics (corrosion resistance, abrasion or erosion resistance, etc.), or to increase the strength of the tube, the outer periphery or inner periphery of the tube is weld overlaid. For example, Patent Literature 1 discloses a device for weld overlaying the outer periphery of the tube in this manner.

The weld overlay system disclosed in Patent Literature 1 includes a tube holder which holds and rotates a tube, a preheat holder which preheats a weld overlay material and holds the weld overlay material adjacently to the tube, a welding robot including a welding torch (GTAW (gas shielded tungsten arc welding) torch) at a tip end thereof, and a travel device which moves the welding robot in the longitudinal direction of the tube. The welding torch is positioned at 20 to 35 degrees from the top of the tube. By use of this weld overlay system, a filler metal and a base metal (tube) are melted by arch heat generated between the welding torch and the base metal while rotating the tube, and thereby a bead of the melted overlay material of a spiral shape is formed on the surface of the base metal. During the welding, the welding torch oscillates in the longitudinal direction of the tube, and the vertical position of the welding torch is controlled to provide an appropriate arc length, by an AVC (arc voltage control) device. In addition, to control the temperature of the base metal during the welding, water is flowed through the tube.

CITATION LIST

Patent Literature

Patent Literature 1: U.S. Pat. No. 6,781,083B1

SUMMARY OF INVENTION

Technical Problem

As a weld overlay process progresses, in a case where an elongated tube is weld overlaid over substantially the whole length, the tube is distorted due to the heat input to the tube. If the weld overlay process is continued without compensating this distortion, the relative position of the tube with respect to the welding torch is displaced (changed) in a horizontal direction and/or a vertical direction. In some cases, the amount of this displacement may reach several centimeters or more in the vertical direction and/or the horizontal direction, due to the effects of eccentricity of the tube. In order to maintain a high weld overlay quality, it is desirable to compensate the displacement of the relative position of the tube with respect to the welding torch. However, in the weld overlay system disclosed in Patent Literature 1, the welding torch is displaced by the AVC device, to copy only one axial (vertical) component of the displacement of the tube. In other words, the welding torch does not copy a horizontal component of the displacement of the tube. For this reason, if the amount of distortion of the tube exceeds a specified amount, good welding cannot be performed, and a welding quality is degraded.

In view of the above-described circumstances, the present invention has been made. An object of the present invention is to secure a welding quality by causing a welding torch to copy a deformation of a workpiece of a circular tube shape, in two-axis directions.

Solution to Problem

A weld overlay system which weld overlays an outer peripheral surface of a workpiece of a circular tube shape, of the present invention, comprises a workpiece jig which holds the workpiece in such a manner that a center axis direction of the workpiece conforms to a first direction, and rotates the workpiece in a circumferential direction thereof; a carriage which moves in the first direction along the workpiece held by the workpiece jig; a welding base supported on the carriage in such a manner that the welding base is relatively displaceable with respect to the carriage in a second direction perpendicular to the first direction and in a third direction perpendicular to the first direction and the second direction; at least one pair of rollers including rotary shafts (rotary axes), respectively, extending in parallel with the first direction, the pair of rollers being supported on the welding base in such a manner that the rotary shafts of the pair of rollers are spaced apart from each other in the second direction, and the pair of rollers are pressed against the outer peripheral surface of the workpiece to maintain a distance between the welding base and the workpiece at a constant value; and a welding torch supported on the welding base in such a manner that a tip end of the welding torch is positioned between the rotary shafts of the pair of rollers in the second direction.

In the weld overlay system having the above-described configuration, in portions of the workpiece which are in contact with the pair of rollers, the relative positions of the pair of rollers with respect to the workpiece are maintained to be fixed. Therefore, when the workpiece is displaced (deformed) in at least one of the second direction and the third direction, in the portions of the workpiece which are in contact with the pair of rollers, the welding base provided with the pair of rollers moves, following the displacement of the workpiece. According to the movement of the welding base, the welding torch supported on the welding base also moves. That is, the welding torch can copy (follow) in two-axis directions (namely, the second direction and the third direction) a displacement of the relative position of a tube with respect to the welding torch. In this way, a distance between the tip end of the welding torch and the base metal can be maintained at a constant value. As a result, the workpiece can be weld overlaid uniformly, and a high welding quality can be secured.

In the above-described weld overlay system, preferably, the welding base is disposed above the workpiece, and the pair of rollers are pressed against the outer peripheral surface of the workpiece by a gravitational force.

In accordance with this configuration, since the welding base can serve to perform at least a part of a function as a device which applies a load for allowing the pair of rollers to be pressed against the workpiece, the configuration of the system can be simplified.

The above-described weld overlay system preferably comprises a horizontal movement mechanism provided between the carriage and the welding base to move the welding base in a horizontal direction with respect to the carriage; and a vertical movement mechanism provided between the carriage and the welding base to move the welding base in a vertical direction with respect to the carriage, wherein the vertical movement mechanism includes an elastic member.

In accordance with this configuration, the elastic member can bear the load applied to the welding base. Further, a function as a damper for absorbing energy of vertical movement of the welding base can be provided between the carriage and the welding base.

The above-described weld overlay system preferably further comprises a shield box which covers the tip end of the welding torch and a region that is in the vicinity of the tip end of the welding torch; and a shielding gas source which supplies a shielding gas to the shield box.

In accordance with this configuration, since the interior of the shield box is in a shielding gas ambience, an overlay layer of a high quality can be formed on the surface of the workpiece.

In the above-described overlay system, preferably, the welding torch includes a non-consumable electrode, and the weld overlay system further comprises a torch jig which holds the welding torch; and an AVC unit which supports the torch jig, and moves the torch jig in the third direction with respect to the welding base to maintain an arc length between the non-consumable electrode and a base metal at a constant value.

In accordance with this configuration, by the operation of the AVC unit, the welding torch can copy the displacement (deformation) of the workpiece with a higher accuracy.

In the above-described weld overlay system, preferably, the pair of rollers are mounted to the welding base in such a manner that a distance in the second direction between the rotary shafts of the pair of rollers is changeable.

In accordance with this configuration, by changing the distance in the second direction between the rotary shafts of the pair of rollers, depending on a variation in outer diameter from one workpiece to another workpiece, and a difference in outer diameter between the workpiece which is not yet weld overlaid and the workpiece which has been weld overlaid, a proper posture of the welding base can be maintained.

In the above-described weld overlay system, preferably, the pair of rollers include a first pair of rollers and a second pair of rollers which are disposed on both sides of the welding torch in the first direction, and the first pair of rollers are pressed against the outer peripheral surface of the workpiece which is not yet weld overlaid and the second pair of rollers are pressed against the outer peripheral surface of the workpiece which has been weld overlaid.

In accordance with this configuration, since the pairs of rollers are disposed on both sides in a direction in which the welding torch travels along the workpiece, the motion of the welding torch which copies the deformation of the workpiece can be stabilized.

Advantageous Effects of Invention

In accordance with the present invention, the welding torch can be moved in such a manner that the welding torch copies a deformation of a workpiece of a circular tube shape, in two-axis directions which are a second direction perpendicular to the center axis direction of the workpiece, and a third direction perpendicular to the center axis direction and the second direction. This makes it possible to maintain a distance between the tip end of the welding torch and the base metal at a constant value. As a result, the workpiece can be weld overlaid uniformly, and a high welding quality can be secured.

DESCRIPTION OF EMBODIMENTS

Figure 1:
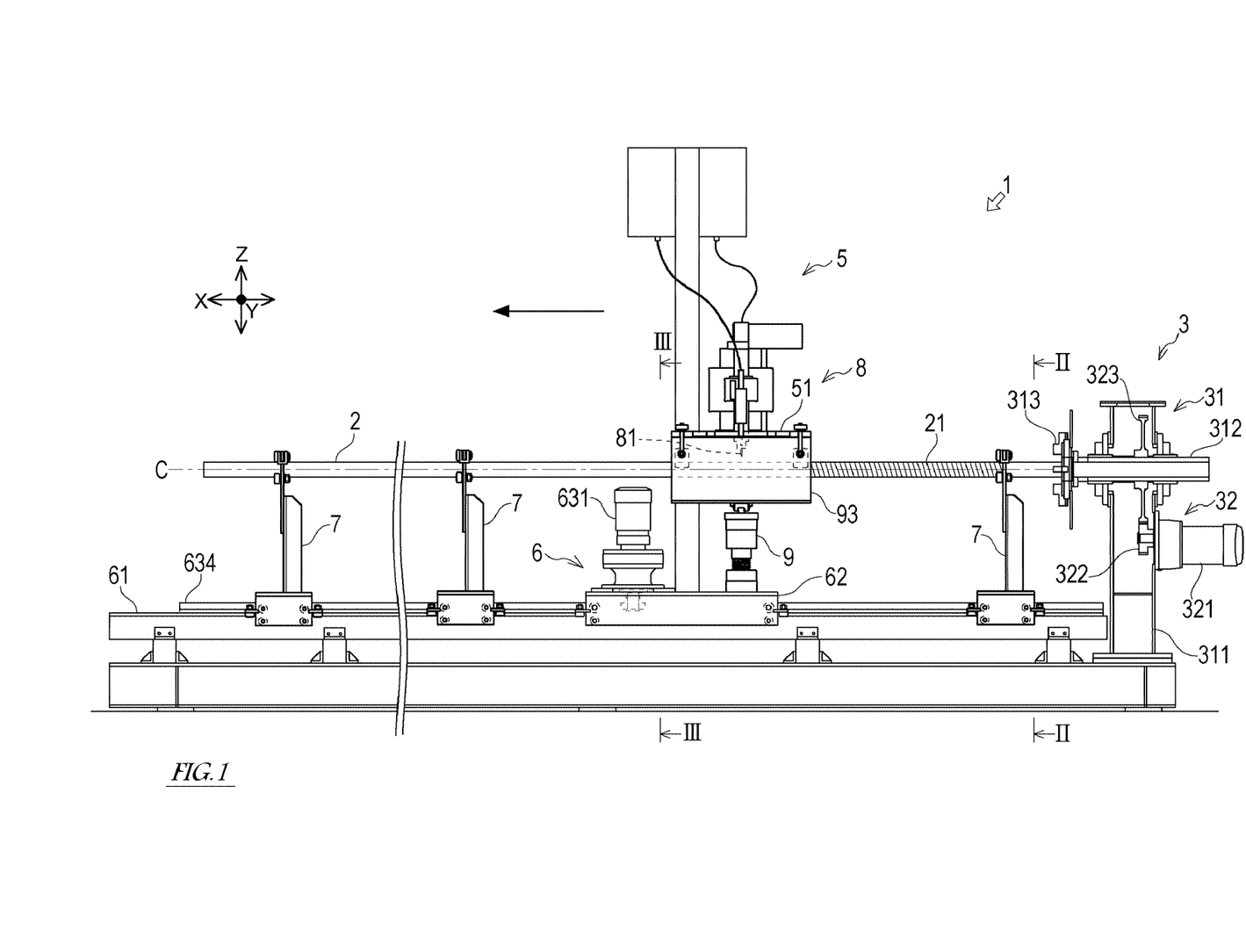
FIG. 1 is a view showing the overall configuration of a weld overlay system according to the embodiment of the present invention.

Hereinafter, the embodiment of the present invention will be described with reference to the drawings. As shown in FIG. 1, a weld overlay system 1 according to the present embodiment is a system for welding a workpiece 2 of a circular tube shape by applying a weld overlay material 21 to the outer peripheral surface of the workpiece 2. The outer peripheral surface of the workpiece 2 which has been weld overlaid, namely, a weld overlaid product, is covered with a spiral overlay layer comprising the weld overlay material 21 which is thickly wound around the workpiece 2. The workpiece 2 according to the present embodiment is, for example, a circular tube made of a metal material, such as a steel pipe. The weld overlay material 21 is a metal material to be selected depending on desired surface characteristics of the weld overlaid product, or a metal material to be selected to allow the weld overlaid product to have a desired strength.

The weld overlay system 1 includes as main constituents, a workpiece jig 3, a welding device 5, and a travel device 6. The workpiece jig 3 is capable of retaining the workpiece 2 in such a manner that a direction in which the center axis C of the workpiece 2 extends, namely, a center axis direction (also referred to as a longitudinal direction) conforms to a horizontal direction. The workpiece jig 3 is also capable of rotating the workpiece 2 in a circumferential direction thereof. The travel device 6 includes a carriage 62 which is movable in the center axis direction along the workpiece 2 retained by the workpiece jig 3. The welding device 5 includes a welding base 51 supported on the carriage 62 in such a manner that the welding base 51 is relatively displaceable in the horizontal direction and a vertical direction with respect to the carriage 62, at least one pair of rollers 58 supported on the welding base 51, a welding unit 8 including a welding torch 81 supported on the welding base 51, and the like. As defined herein, the center axis direction (first direction) of the workpiece 2 retained by the workpiece jig 3 will be referred to as "X-axis direction," a vertical direction (third direction) will be referred to as "Z-axis direction," and a horizontal direction (second direction) perpendicular to the X-axis direction and the Z-axis direction will be referred to as "Y-axis direction." Hereinafter, the constituents of the weld overlay system 1 will be described in detail.

Initially, the workpiece jig 3 will be described. The workpiece jig 3 includes a rail 61 extending in the X-axis direction, a plurality of movable support columns 7 arranged in the X-axis direction on the rail 61, and at least one fixed support column 31 provided on at least a first (one) end portion of the rail 61 in the X-axis direction.

The fixed support column 31 is provided at the end portion of the rail 61, at which welding starts, of the both end portions of the rail 61 in the X-axis direction. Alternatively, the fixed support column 31 may be provided at the both end portions of the rail 61 in the X-axis direction. The fixed support column 31 includes a support column body 311, a rotary shaft 312 rotatably supported on the support column body 311 via a bearing, a chuck 313 provided at the rotary shaft 312, and a rotation drive mechanism 32 of the rotary shaft 312. The rotary shaft 312 extends in parallel with the X-axis direction. The chuck 313 is provided at a first end portion of the rotary shaft 312 in the X-axis direction. The chuck 313 serves to grip the end portion of the workpiece 2 in the center axis direction. The center axis C of the workpiece 2 gripped by the chuck 313 is coaxial with the center axis of the rotary shaft 312.

The rotation drive mechanism 32 according to the present embodiment includes a motor 321 as a driving force source, a pinion gear 322 fitted to the output shaft of the motor 321, and a drive gear 323 fitted to the rotary shaft 312. In the rotation drive mechanism 32 having the above-described configuration, the rotational drive force is transmitted from the motor 321 to the rotary shaft 312 via a driving force transmission mechanism including the pinion gear 322 and the drive gear 323. According to the rotation of the rotary shaft 312, the workpiece 2 held at its end portion by the rotary shaft 312 rotates integrally with the rotary shaft 312.

Figure 2:
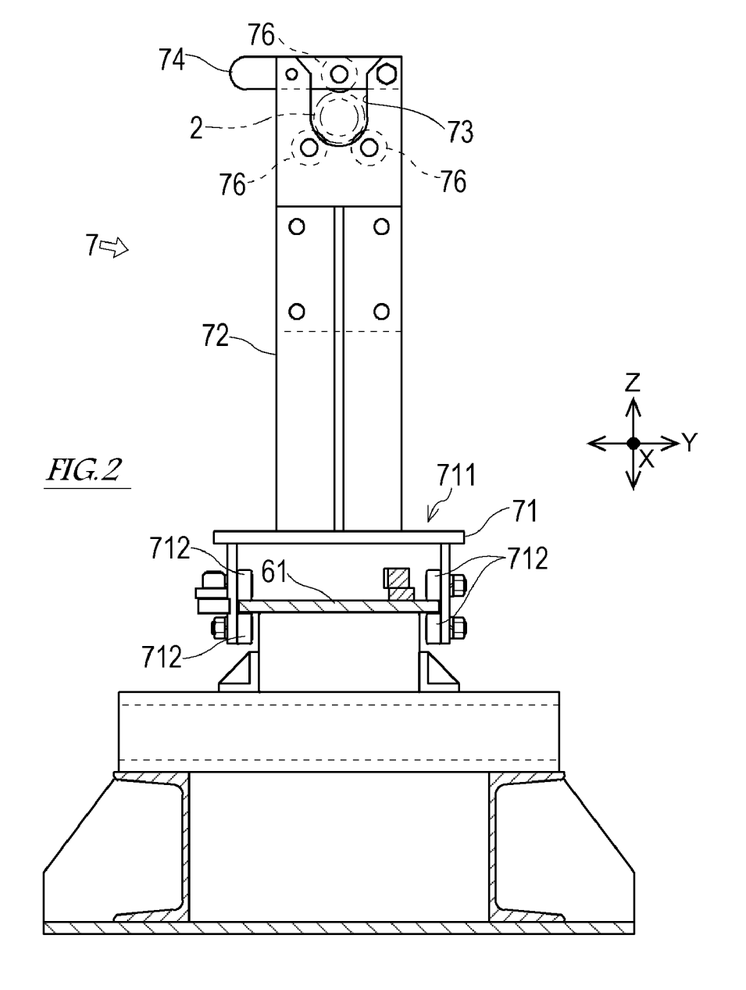
FIG. 2 is an end view taken in the directions of arrows along line II-II of FIG. 1.

FIG. 2 is an end view taken in the directions of arrows along line II-II of FIG. 1 and showing the movable support column 7 when viewed in the X-axis direction. The movable support column 7 includes at a base portion a slider 71 which is movable on the rail 61. The slider 71 allows the movable support column 7 to move in the X-axis direction on the rail 61. The slider 71 includes a slider base 711, and rollers 712 which are rotatably supported on the slider base 711 and sandwich the rail 61 from above and below. A support column body 72 of a column shape with a rectangular cross-section extends vertically upward from the slider base 711.

The support column body 72 is provided with an elongated groove 73 which opens upward. The bottom portion of the groove 73 is formed with a lower semi-circular portion with an inner diameter larger than the outer diameter of the workpiece 2 to be handled in the weld overlay system 1. A bar 74 capable of closing the entrance of the groove 73 is provided on the upper portion of the support column body 72. A first (one) end portion of the bar 74 is rotatably supported on the support column body 72, while a second (the other) end portion of the bar 74 is secured to the support column body 72 by a lock pin. The entrance of the groove 73 is closed by the bar 74, and thereby the movable support column 7 is formed with an insertion hole 75 into which the workpiece 2 is inserted. A plurality of cam followers 76 are provided at proper positions on the circumference of the insertion hole 75. Each of the cam followers 76 includes a roller which rolls on the surface of the workpiece 2 inserted into the insertion hole 75. In the present embodiment, the movable support column 7 includes three cam followers 76 to support the workpiece 2 at three points, specifically, one cam follower 76 located at the bar 74 and two cam followers 76 located on the circumference of the insertion hole 75 at the support column body 72, which are disposed in a well-balanced manner. It should be noted that the number and position of the cam followers 76 are not limited to those of the present embodiment.

The positions of the cam followers 76 on the movable support column 7 may be fixed. Or, the relative positions of the cam followers 76 on the movable support column 7 may be variable to be adapted to the workpieces 2 with different outer diameters. By changing the relative positions of the cam followers 76 with respect to the movable support column 7, a distance (corresponding to the radius of the workpiece 2 inserted into the movable support column 7) from the center of the insertion hole 75 to the periphery of the roller of each of the cam followers 76 can be adjusted. For example, regarding the cam follower 76 provided at the bar 74, the support column body 72 may be provided with a plurality of insertion holes for the lock pin, and one insertion hole into which the lock pin is to be inserted may be selected from among the plurality of insertion holes. In this way, the distance from the center of the insertion hole 75 to the cam follower 76 can be adjusted. Regarding the cam followers 76 provided at the support column body 72, for example, the support column body 72 may be provided with a plurality of mounting holes or an elongated mounting hole for these cam followers 76. By changing a position at which each of the cam followers 76 is mounted to the support column body 72, the distance from the center of the insertion hole 75 to each of the cam followers 76 can be adjusted.

Next, the travel device 6 will be described. The travel device 6 is an X-axis movement device which moves the welding device 5 in the X-axis direction. The travel device 6 includes the rail 61 extending in the X-axis direction, the carriage 62 which is a slider in the X-axis direction and travels on the rail 61, and a slider drive mechanism 63 which moves the carriage 62. The rail which is an element of the above-described workpiece jig 3 is also used as the rail 61.

Figure 3:
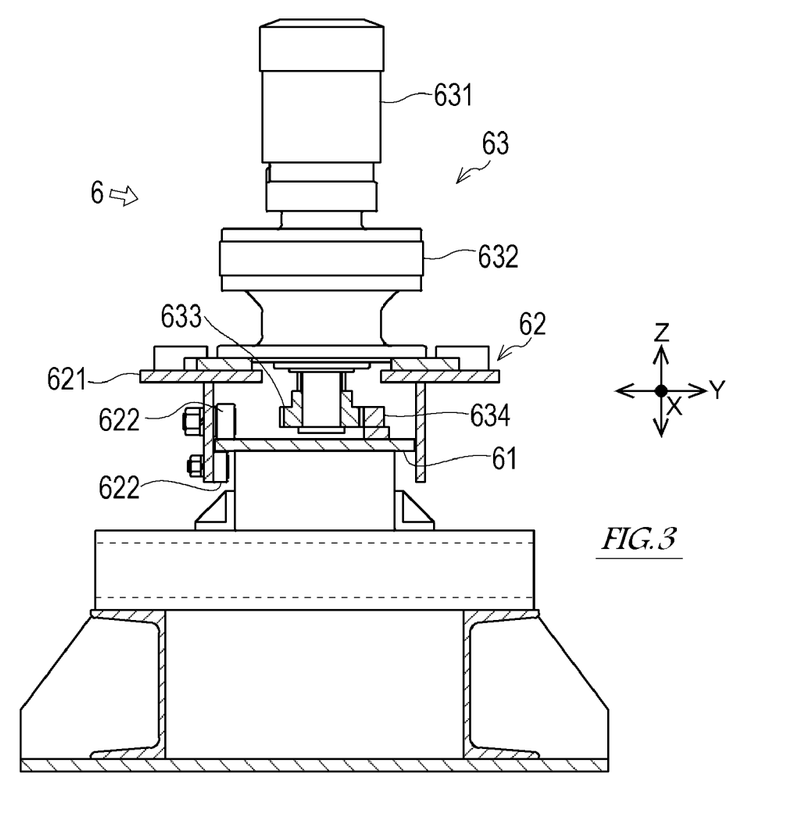
FIG. 3 is a cross-sectional end view taken in the directions of arrows along line of FIG. 1.

FIG. 3 is a cross-sectional end view taken in the directions of arrows along line of FIG. 1, and showing the carriage 62 and the slider drive mechanism 63, when viewed in the X-axis direction. The carriage 62 includes a slider base 621, and rollers 622 which are rotatably supported on the slider base 621 and sandwich the rail 61 from above and below. The welding device 5 and movable members of the slider drive mechanism 63 are mounted to the carriage 62.

The slider drive mechanism 63 includes a motor 631 which is a driving force source, a reduction gear 632 which reduces the speed of the rotation output from the motor 631, a pinion gear 633 fitted to the output shaft of the reduction gear 632, and a rack 634 which is in mesh with the pinion gear 633. The motor 631, the reduction gear 632, and the pinion gear 633 are the movable members mounted to the carriage 62 and are movable together with the carriage 62. The rack 634 is fastened onto the rail 61 and extends in the X-axis direction along the rail 61.

In the travel device 6 having the above-described configuration, the rotation output from the motor 631 is speed-reduced by the reduction gear 632, and then transmitted to the pinion gear 633. In a state in which the pinion gear 633 and the rack 634 are in mesh, the carriage 62 travels on the rail 61. The operation of the motor 631 is controlled by a welding controller 85 which is will be described later.

Figure 4:
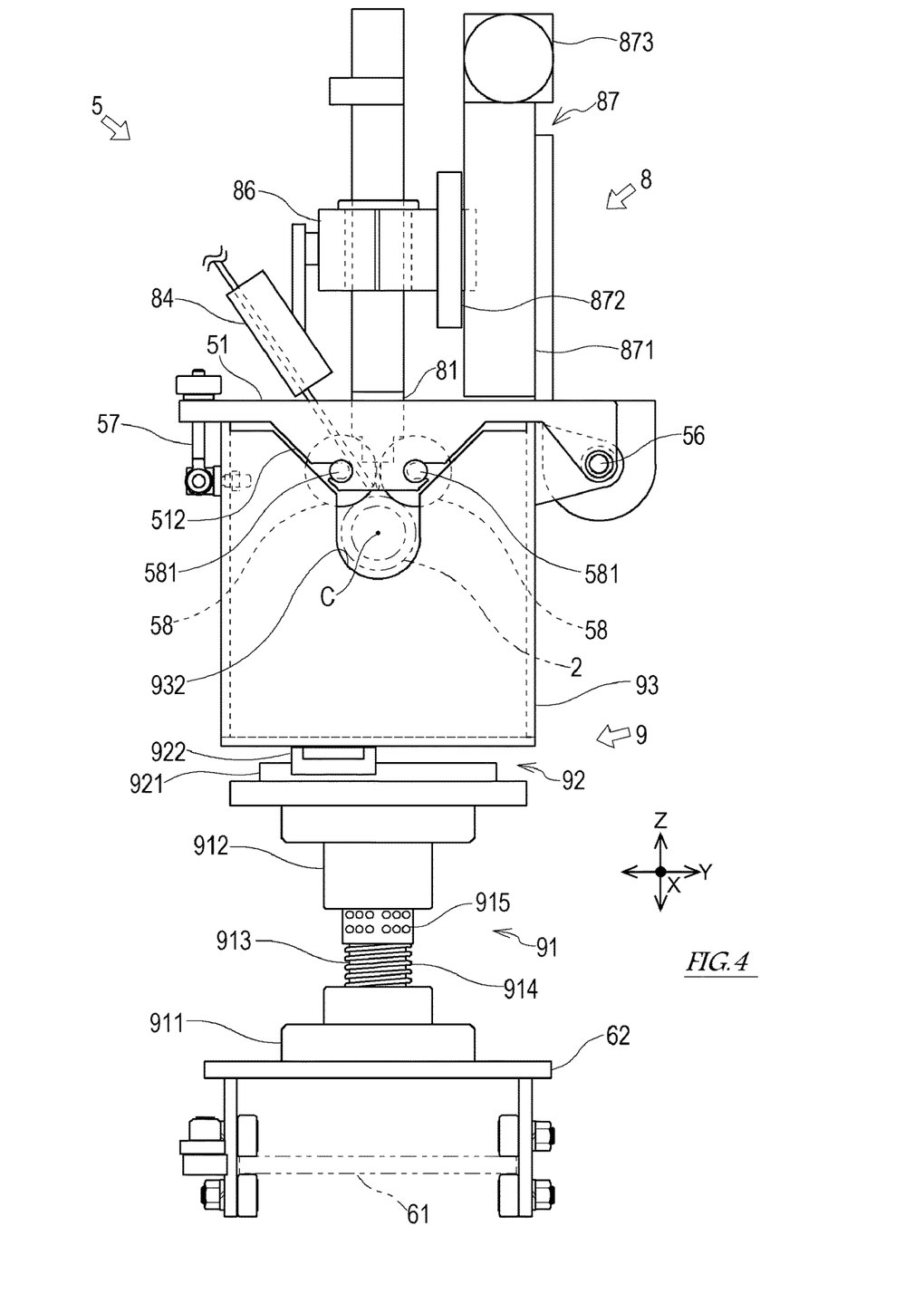
FIG. 4 is a view showing a welding device when viewed in a X-axis direction.
Figure 5:
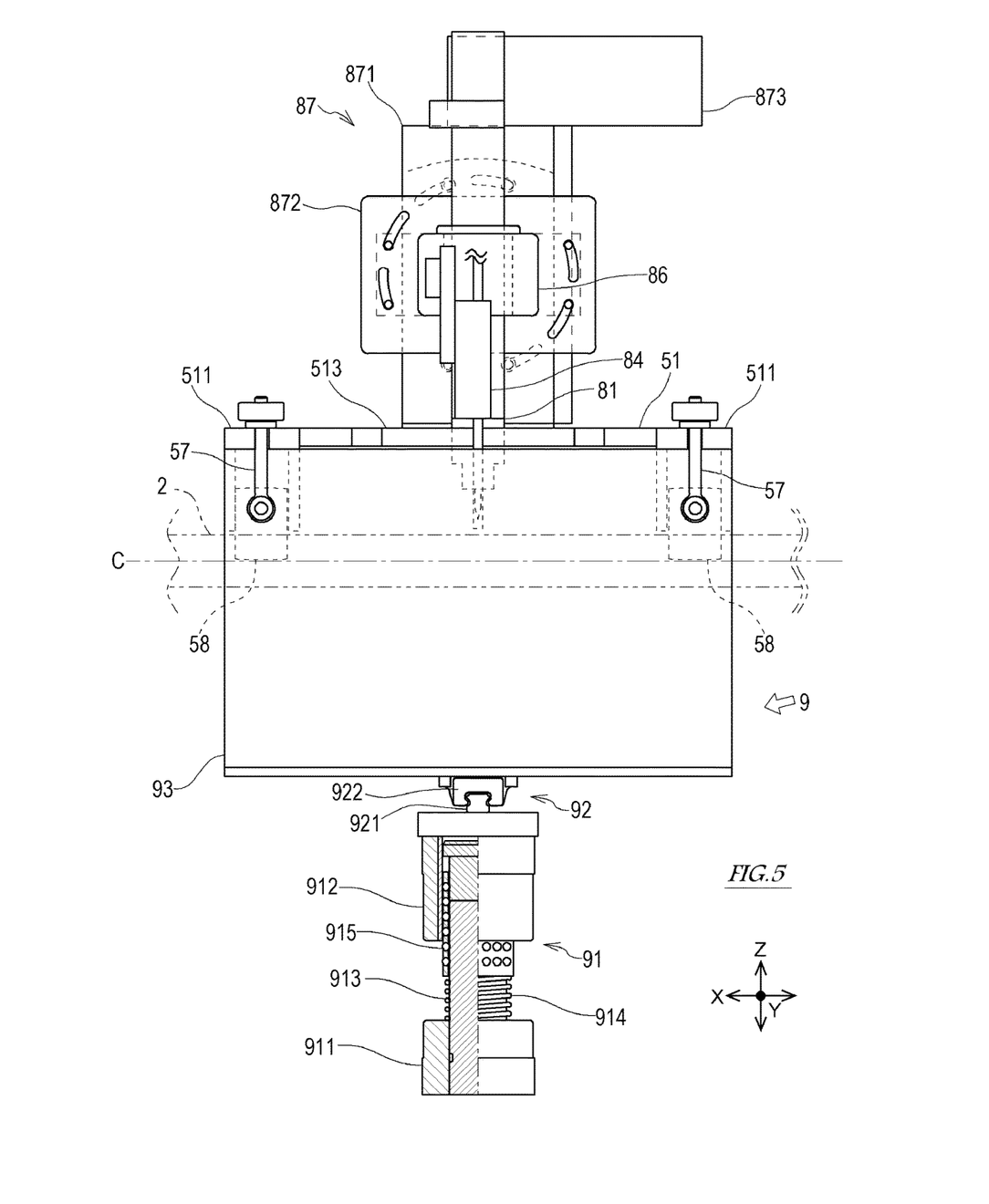
FIG. 5 is a view showing the welding device when viewed in a Y-axis direction.
Figure 6:
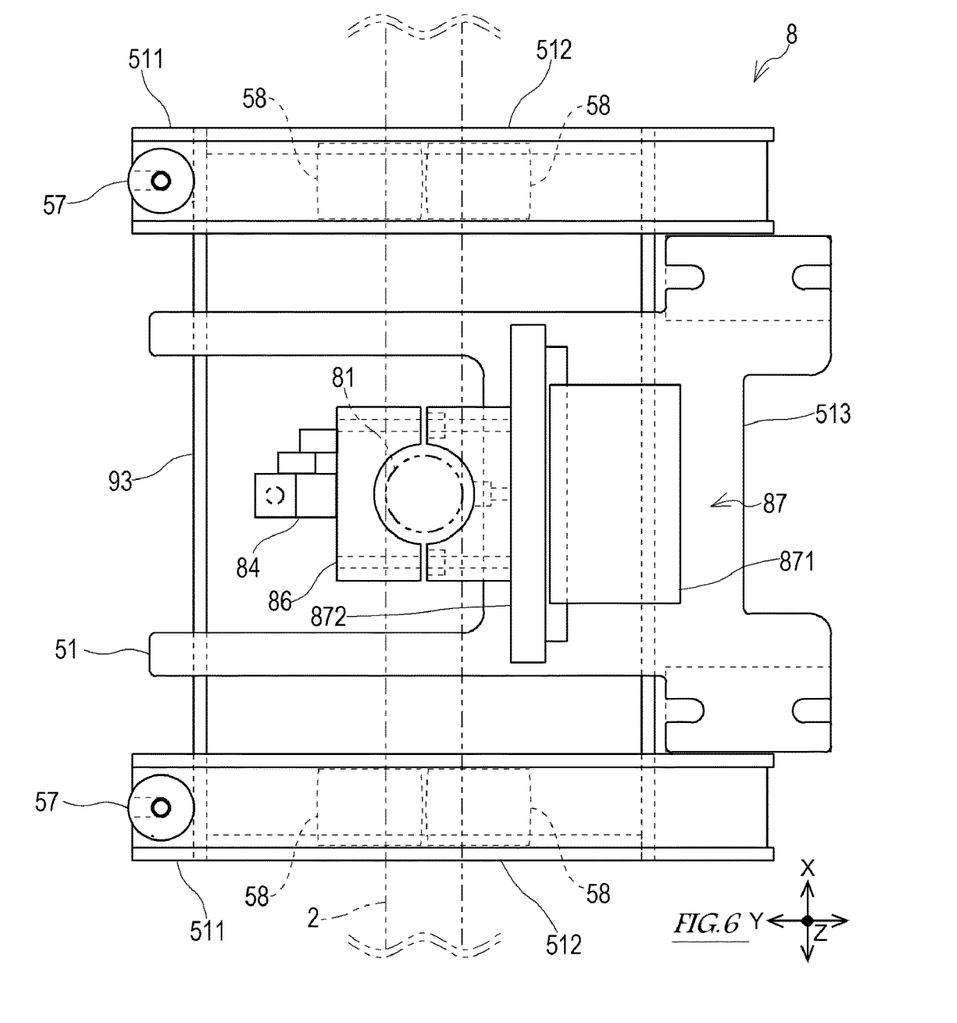
FIG. 6 is a view showing the welding device when viewed in a Z-axis direction.

Next, the welding controller 85 will be described in detail. FIG. 4 is a view showing the welding device 5 when viewed in the X-axis direction. FIG. 5 is a view showing the welding device 5 when viewed in the Y-axis direction. FIG. 6 is a view showing the welding device 5 when viewed in the Z-axis direction. As shown in FIGS. 1 and 4 to 6, the welding device 5 includes the welding base 51 disposed above the workpiece 2, at least one pair of rollers 58 mounted to the welding base 51, the welding unit 8 supported on the welding base 51, and a stand 9 which allows the welding base 51 to stand on the carriage 62.

The stand 9 includes a Z-axis movement mechanism 91 provided on the carriage 62, a Y-axis movement mechanism 92 provided on the Z-axis movement mechanism 91, and a shield box 93 provided on the Y-axis movement mechanism 92. The stand 9 allows the welding base 51 to be relatively displaced in two-axis directions which are the Y-axis direction and the Z-axis direction, with respect to the carriage 62.

The Z-axis movement mechanism 91 includes a lower base 911 fastened to the carriage 62, an upper base 912 fastened to the Y-axis movement mechanism 92, a slider shaft 913 which is fastened to the lower base 911, is slidably internally fitted to the upper base 912, and extends in the Z-axis direction, a spring 914 which is an elastic member provided between the lower base 911 and the upper base 912, and a bearing 915 interposed between the slider shaft 913 and the upper base 912. The spring 914 biases the upper base 912 in an upward direction to cause the lower base 911 and the upper base 912 to act repulsively in the Z-axis direction.

The Z-axis movement mechanism 91 having the above-described configuration allows the welding base 51 to be relatively displaceable in the Z-axis direction with respect to the carriage 62 and is capable of functioning as a damper when the welding base 51 is displaced in the Z-axis direction.

The Y-axis movement mechanism 92 includes a rail 921 extending in the Y-axis direction, and a Y-axis slider 922 which travels on the rail 921. The rail 921 is fastened to the upper base 912 of the Z-axis movement mechanism 91. The Y-axis slider 922 is fastened to the shield box 93. The Y-axis movement mechanism 92 allows the welding base 51 to be relatively displaced in the Y-axis direction with respect to the carriage 62.

The shield box 93 is a cubic box which opens on one side (upper side) in the Z-axis direction. The workpiece 2 is inserted in the X-axis direction into the shield box 93. A shielding gas supply port 931 (see FIG. 7) is provided on the bottom portion or side surface lower portion of the shield box 93. Through the shielding gas supply port 931, a shielding gas is supplied from a shielding gas source to the interior of the shield box 93. This shielding gas is desirably the same as a shielding gas ejected from the welding torch 81 which will be described later. The shielding gas is, for example, an inert gas such as an argon gas or a carbon dioxide gas.

Grooves 932 are provided in the surfaces of the shield box 93, facing in the X-axis direction in such a manner that the grooves 932 are cut in a range from the upper end of the shield box 93 to a position at which the workpiece 2 is inserted into the shield box 93. When viewed in the X-axis direction, a portion of each of the grooves 932 on an entrance side (upper side) has a tapered trapezoidal shape which is made gradually narrower in a downward direction. When viewed in the X-axis direction, the bottom portion of each of the grooves 932 has a semi-circular shape with an inner diameter larger than the outer diameter of the workpiece 2. The workpiece 2 is inserted into the shield box 93 in such a manner that the workpiece 2 passes through this semicircular portion of each of the grooves 932. It should be noted that the shield box 93 does not directly contact the workpiece 2.

The welding base 51 is coupled to the shield box 93 (namely, the stand 9) in such a manner that the welding base 51 covers the shield box 93 from above, like a lid. The both end portions of the welding base 51 in the X-axis direction are coupling sections 511 coupled to the shield box 93. A first end of each of the coupling sections 511 in the Y-axis direction is rotatably supported on the shield box 93 via a bearing (support) shaft 56. A second end of each of the coupling sections 511 in the Y-axis direction is joined to the shield box 93 by a pin 57 having a base end supported on the upper portion of the shield box 93. The effective length of the pin 57, from the base end to an engagement section of the welding base 51 is adjustable. By adjusting the effective length of the pin 57, a difference in the outer diameter of the workpiece 2 disposed between the shield box 93 and the welding base 51 can be dealt with.

Each of the coupling sections 511 of the welding base 51 is provided with a downward extension section 512 extending downward in the Z-axis direction and having a shape conforming to the trapezoidal shape at the entrance side of the groove 932 of the shield box 93. The downward extension section 512 is configured to close the trapezoidal portion of the groove 932 of the shield box 93. The pair of rollers 58 having the same shape are supported on the downward extension section 512. The pair of rollers 58 include rotary shafts 581, respectively, extending in parallel with the X-axis direction. The tip end (tip end of an electrode) of the welding torch which will be described later is positioned between the rotary shafts 581 of the pair of rollers 58 in the Y-axis direction.

The rollers 58 roll on the outer peripheral surface of the workpiece 2 inserted into the shield box 93. To this end, locations at which the rollers 58 are mounted to the downward extension section 512 are set so that the rollers 58 roll on the outer peripheral surface of the workpiece 2 and are pressed against the outer peripheral surface of a portion of the workpiece 2 which is above the center axis C. In this way, the welding base 51 is placed on the workpiece 2 via the pair of rollers 58 provided at each of the both end portions of the welding base 51 in the X-axis direction. A load including the weight of at least a portion of the welding base 51 is applied from the welding base 51 to the pair of rollers 58 so that the rollers 58 are pressed against the outer peripheral surface of the workpiece 2.

The stand 9 allows the welding base 51 to move in the Y-axis direction and the Z-axis direction. Therefore, a straight line in the Y-axis direction connecting the rotary shafts 581 of the pair of rollers 58 provided at the welding base 51 is not tilted and is maintained to be horizontal. As described above, because of a relationship between the pair of rollers 58 mounted to the welding base 51 and the workpiece 2, the relative positions of the pair of rollers 58 with respect to the workpiece 2 can be maintained to be fixed. Therefore, when portions of the workpiece 2 which are in contact with the pair of rollers 58 are displaced in at least one of the Y-axis direction and the Z-axis direction, the pair of rollers 58 and the welding base 51 are moved together in Y-axis direction and/or the Z-axis direction, by copying (following) the displacement of the workpiece 2.

The pair of rollers 58 (a pair of rollers at an upstream side in the welding) provided at one of the two downward extension sections 512 of the welding base 51 are in contact with the workpiece 2 (weld overlaid product) formed with an overlay layer on a surface thereof, whereas the pair of rollers 58 (a pair of rollers at a downstream side in the welding) provided at the other of the two downward extension sections 512 of the welding base 512 are in contact with the surface of the workpiece 2. In other words, there is a difference between the diameter of the workpiece 2 with which the pair of rollers on the upstream side in the welding are in contact and the diameter of the workpiece 2 with which the pair of rollers on the downstream side in the welding are in contact. The distance in the Y-axis direction between the rotary shafts 581 of the pair of rollers 58 is adjusted to allow the welding base 51 to maintain a proper posture (namely, horizontal posture), irrespective of the difference in outer diameter between the workpiece 2 which is not yet weld overlaid and the workpiece 2 which has been weld overlaid, or a variation in outer diameter from one workpiece 2 to another workpiece 2. For this purpose, joining portions of the downward extension section 512 and the rollers 58 are configured in such a manner that the relative mounting locations of the pair of rollers 58 with respect to the downward extension section 512 are changeable in the Y-axis direction. Specifically, the downward extension section 512 is formed with a hole which is elongated in the Y-axis direction, which is used to mount the rollers 58 to the downward extension section 512, and the mounting locations of the rotary shafts 581 of the pair of rollers 58 are changeable within the range of this elongated hole. For example, the mounting locations of the pair of rollers 58 are determined in such a manner that the distance in the Y-axis direction between the rotary shafts 581 of the pair of rollers 58 at the upstream side in the welding is set to be larger than the distance in the Y-axis direction between the rotary shafts 581 of the pair of rollers 58 at the downstream side in the welding. This makes it possible to make a difference between the distance in the Y-axis direction between the rotary shafts 581 of the pair of rollers 58 which are in contact with the workpiece 2 which is not yet weld overlaid and the distance in the Y-axis direction between the rotary shafts 581 of the pair of rollers 58 which are in contact with the workpiece 2 which has been weld overlaid.

Figure 7:
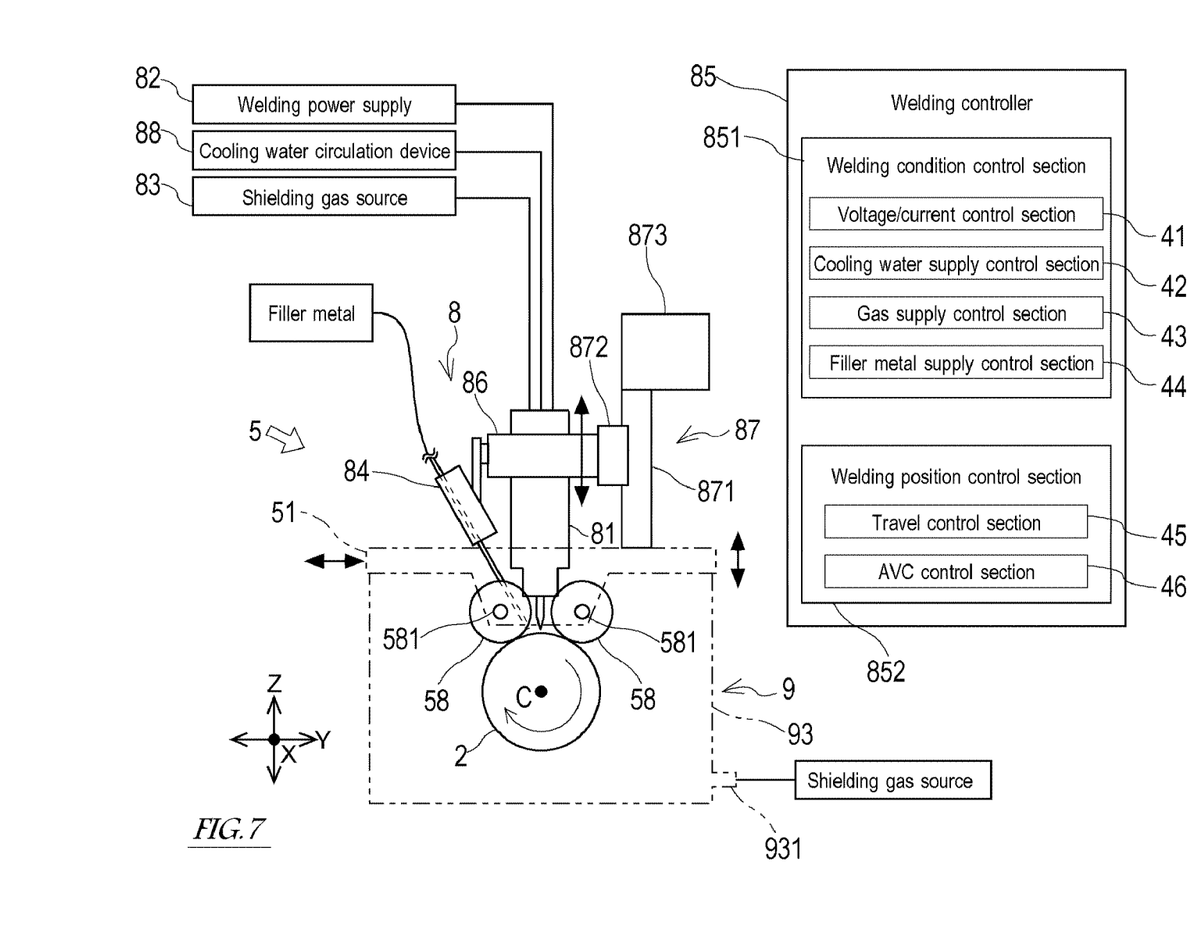
FIG. 7 is a view showing the schematic configuration of a welding unit and the configuration of a control system of the weld overlay system.

A portion of the welding base 51 which is between the coupling sections 511 in the X-axis direction is a welding unit support section 513 for supporting the welding unit 8. FIG. 7 shows the schematic configuration of the welding unit 8 and the configuration of a control system of the weld overlay system 1. The welding unit 8 is a device group for performing TIG (tungsten inert gas) welding. The welding unit 8 includes the welding torch 81, a welding power supply 82 which supplies electricity to the welding torch 81, a cooling water circulation device 88 which supplies cooling water to the welding torch 81, a shielding gas source 83 which supplies the shielding gas to the welding torch 81, a filler metal supply device 84 which supplies a filler metal which is the weld overlay material 21 to a region that is in the vicinity of the tip end of the welding torch 81, the welding controller 85 which controls the operation of the weld overlay system 1, and the like.

The welding torch 81 is provided with a nozzle, a tungsten electrode provided at the center portion of the nozzle, a cooling passage through which the cooling water is flowed, and the like (these are not shown). As the shielding gas, for example, the inert gas such as the argon gas or the carbon dioxide gas is used.

The filler metal supply device 84 is configured to draw the filler metal from a coil of the filler metal, and supply the filler metal to the region that is in the vicinity of the tip end of the welding torch 81, at a speed corresponding a welding speed. It should be noted that the filler metal supply device 84 may be provided with a preheater for preheating the filler metal.

The welding torch 81 and the filler metal supply device 84 are retained on one torch jig 86. The torch jig 86 is supported on the welding base 51 via an AVC unit 87. The AVC unit 87 includes a rail 871 in the Z-axis direction, extending vertically upward on the welding base 51, a slider 872 which is movable on the rail 871, a Z-axis movement motor 873 which is a drive device of the slider 872, and an AVC control section 46. The torch jig 86 is mounted to the slider 872. The torch jig 86 is movable (pivotable) with respect to the slider 872 so that the inclination angle of the welding torch 81 with respect to a forward and rearward direction is adjustable.

The welding controller 85 is a computation controller which performs computation and control for operating the weld overlay system 1. The welding controller 85 includes a CPU (central processing unit), a ROM (read only memory), a RAM (random access memory: including a non-volatile memory (non-volatile RAM)), I/F (interface), I/O (input/output port), and the like (these are not shown). Programs to be executed by the CPU, fixed data, and the like are stored in the ROM. The programs to be executed by the CPU are saved in a storage medium such as a flexible disc, a CD-ROM, or a memory card. The programs are installed from the storage medium on the ROM. Data required in the execution of the programs is temporarily stored in the RAM. The I/F performs data transmission/reception with an external device (a personal computer connected to the welding controller 85, and the like). The I/O performs input/output of detection signals of sensors. The welding controller 85 is configured in such a manner that software such as the programs stored in the ROM and hardware such as the CPU cooperate with each other to execute processing for performing the functions of the welding controller 85 which will be described below. It should be noted that the welding controller 85 may be configured in such a manner that a single CPU executes the processing, or a plurality of CPUs or a combination of the CPU and specific processing circuits execute the processing.

A welding condition control section 851 has a function for controlling welding conditions, such as a voltage/current control section 41 which controls a voltage and a current which are supplied from the welding power supply 82 to the electrode, a cooling water supply control section 42 which controls the operation of the cooling water circulation device 88, a gas supply control section 43 which controls the amount of the shielding gas supplied from the shielding gas source 83, and a filler metal supply control section 44 which controls the speed at which the filler metal is supplied from the filler metal supply device 84. The welding condition control section 851 controls the welding conditions according to the welding conditions preset in the welding controller 85.

A welding position control section 852 has a function for controlling the position of the tip end of the welding torch 81, such as a travel control section 45 which controls the position of the welding torch 81 in the X-axis direction by the travel device 6, and the AVC control section 46 which controls a vertical distance from the base metal to a non-consumable electrode of the welding torch 81, by the AVC unit 87. The travel control section 45 operates the slider drive mechanism 63 of the travel device 6 so that the carriage 62 moves at a specified speed corresponding to the welding speed. The AVC control section 46 measures an arc voltage during the welding, and drives the Z-axis movement motor 873 to move the welding torch 81 retained on the torch jig 86 in the Z-axis direction so that a value of this arc voltage becomes constant. More specifically, the AVC control section 46 compares the arc voltage measured during the welding to a predetermined reference voltage. When the measured arc voltage is lower than the reference voltage, the AVC control section 46 moves up the welding torch 81 and increases the arc voltage. When the measured arc voltage is higher than the reference voltage, the AVC control section 46 moves down the welding torch 81 and decrease the arc voltage. When a difference between the arc voltage measured during the welding and the reference voltage falls into a preset range, the AVC control section 46 stops the movement of the welding torch 81 in the Z-axis direction. With the above-described AVC control, the arc length can be maintained at a constant value during the welding.

Now, the flow of a weld overlay process performed by the weld overlay system 1 having the above-described configuration will be described. Initially, at a preparation stage of the welding, the workpiece 2 is attached to the workpiece jig 3. Specifically, the end portion of the workpiece 2 in the center axis direction is gripped by the chuck 313 provided at the fixed support column 31. Then, the workpiece 2 is inserted into the insertion holes 75 of the movable support columns 7. Then, the motor 321 is operated to rotate the workpiece 2 around the center axis C at a specified speed. In addition, at the preparation stage of the welding, the shielding gas is supplied to the shield box 93 and the interior of the shield box 93 is filled with the shielding gas.

Then, the welding controller 85 controls the operation of the travel device 6 to move the welding torch 81 to an initial X-position. Further, the welding controller 85 controls the travel device 6 so that the welding torch 81 is moved in the X-axis direction at a speed corresponding to a preset predetermined welding speed during the welding. Moreover, the welding controller 85 controls the operation of the AVC unit 87 so that the vertical distance from the base metal to the non-consumable electrode of the welding torch 81, namely, the arc length is maintained at a constant value, during the welding.

Then, the welding controller 85 controls the operations of the welding power supply 82, the shielding gas source 83, the cooling water circulation device 88, and the filler metal supply device 84, to start supply a voltage and a current from the welding power supply 82 to the welding torch 81, supply the shielding gas from the shielding gas source 83 to the welding torch 81, supply the cooling water from the cooling water circulation device 88 to the welding torch 81, and supply the filler metal from the filler metal supply device 84. The welding controller 85 controls the operations of the welding power supply 82, the shielding gas source 83, the filler metal supply device 84, and the cooling water circulation device 88 so that the above-described welding conditions conform to preset welding conditions, respectively.

Upon the actuation of the weld overlay system 1, an arc is generated between the electrode of the welding torch 81 and the base metal (workpiece 2) in a shielding gas ambience. By heat of the arc, the filler metal and the base metal are melted, and the surface of the base metal is weld overlaid. In this way, a spiral bead of the weld overlay material 21 is formed in succession on the surface of the workpiece 2.

As the weld overlay progresses in the course of the above-described weld overlay process, the workpiece 2 is distorted due to the heat input to the workpiece 2. If the weld overlay is continued without compensating this distortion of the workpiece 2, the relative position of the workpiece 2 with respect to the welding torch 81 is displaced (changed) in the Y-axis direction and/or the Z-axis direction. The amount of this displacement is increased due to the effects of eccentricity of the workpiece 2. When the portions of the workpiece 2 which are in contact with the pair of rollers 58 are displaced in at least one of the Y-axis direction and the Z-axis direction, the welding base 51 is moved in the Y-axis direction and/or the Z-axis direction, by copying (following) the displacement of the workpiece 2. In this way, the relative position of the welding base 51 with respect to the workpiece 2 can be maintained to be fixed, and thereby the relative position of the tip end of the welding torch 81 with respect to the workpiece 2 can be maintained to be fixed.

As described above, at least one pair of rollers 58 which are apart from each other in the Y-axis direction, the welding base 51 to which the pair of rollers 58 are mounted, and the stand 9 which supports the welding base 51 in such a manner that the welding base 51 is movable in the Z-axis direction and the Y-axis direction, constitute a copying mechanism in two-axis directions, which moves the welding torch 81 in the Y-axis direction and the Z-axis direction, by copying the displacement of the workpiece 2. The copying mechanism in the two-axis directions allows the relative position of the tip end of the welding torch 81 with respect to the workpiece 2 to be maintained be fixed during the welding. In other words, a distance between the tip end of the welding torch 81 and the base metal can be maintained at a constant value during the welding. As a result, the workpiece 2 can be weld overlaid uniformly, and thus a high welding quality can be secured.

In the above-described copying mechanism in the two-axis directions, since the deformation of the workpiece 2 is not detected or movement of the welding torch 81 in the Y-axis direction and/or the Z-axis direction is not electrically controlled, the welding torch 81 can follow quickly the distortion of the workpiece 2 and copy the deformation of the workpiece 2. In brief, the above-described copying mechanism in the two-axis directions has a high copying responsivity. In addition, since the copying mechanism in the two-axis directions has a mechanical structure, it is able to operate reliably and stably, and does not require an electric controller, programs for the electric controller, and the like. As a result, equipment cost is not increased.

In addition to the above-described copying mechanism in the two-axis directions, the weld overlay system 1 includes the AVC unit 87 for maintaining a constant ark length. The AVC unit 87 makes it possible to more accurately maintain a proper positional relationship between the base metal and the tip end of the welding torch 81. Therefore, a high weld overlay quality can be obtained stably.

So far, the preferred embodiment of the present invention has been described. The above-described configurations can be changed as described below.

For example, in the above-described weld overlay system 1, the straight line connecting the rotary shafts 581 of the pair of rollers 58 to each other is substantially horizontal, and the pair of rollers 58 are pressed against the workpiece 2 by a part of the weights of the welding device 5 including the welding base 51, the shield box 93 and the like. Since the welding base 51 is placed above the workpiece 2 in the vertical direction, and the pair of rollers 58 are pressed against the outer peripheral surface of the workpiece 2 by a gravitational force in the above-described manner, the welding base 51 can serve to perform at least a part of a function as a device which applies a load for allowing the pair of rollers 58 to be pressed against the workpiece 2. Therefore, the configuration of the weld overlay system 1 can be simplified. It should be noted that a load such as a spring load may be applied to the pair of rollers 58 in order to allow the pair of rollers 58 to be pressed against the workpiece 2. In this case, the center axis direction (first direction) of the workpiece 2 is not limited to the horizontal direction and may be a desired direction. In addition, the direction (second direction) perpendicular to the center axis direction of the workpiece 2 is not limited to the vertical direction and may be inclined with respect to the vertical direction. Further, the direction (third direction) perpendicular to the first direction and the second direction is not limited to the horizontal direction, and may be inclined with respect to the horizontal direction.

For example, the welding unit 8 is the device group which performs the TIG welding. However, the welding method performed by the welding unit 8 is not limited to the TIG welding. The welding method performed by the welding unit 8 may be, for example, any one of coating arc welding, MIG welding, MAG welding, TIG welding, submerged arc welding, plasma arc welding, and the like, which are typically used in the weld overlay process.

For example, since the welding method is the TIG welding, the weld overlay system 1 of the above-described embodiment uses the AVC unit 87 typically used as a non-contact copying mechanism in the Z-axis direction of the welding torch including the non-consumable electrode. However, the non-contact copying mechanism in the Z-axis direction is not limited to the AVC. For example, instead of measuring the arc voltage value, the distance between the base metal and the tip end of the welding torch 81 may be measured by a non-contact displacement sensor. In this case, for example, a non-contact copying mechanism may be used, in which the distance between the base metal and the tip end of the welding torch 81 is measured by the non-contact displacement sensor such as a laser sensor, and the torch jig 86 is moved in the Z-axis direction to maintain the measured distance at a predetermined value.

For example, in the weld overlay system 1 of the above-described embodiment, the shield box 93 is provided at the lower portion of the welding base 51, and the welding torch 81 and a region that is in the vicinity of the welding torch 81 are covered by the shield box 93. By providing the shield box 93 in this way, the interior of the shield box 93 is in the shielding gas (inert gas) ambience which is isolated from atmospheric air. Therefore, the overlay layer of a high quality can be formed on the surface of the workpiece 2. Alternatively, a frame member may be provided at the lower portion of the welding base 51, instead of the shield box 93.

For example, in the weld overlay system 1 of the above-described embodiment, the pair of rollers 58 are disposed at each of the both end portions of the welding base 51 in the X-axis direction. However, the number of the rollers 58 may be more than two. Or, in a case where the length of the welding base 51 in the X-axis direction is sufficiently small, the pair of rollers 58 may be provided at a region of the welding base 51 which is close to the center of the welding base 51 in the X-axis direction, instead of providing the pair of rollers 58 at each of the both end portions of the welding base 51 in the X-axis direction.

REFERENCE SIGNS LIST

1 weld overlay system
2 workpiece
21 weld overlay material
3 workpiece jig
31 fixed support column
32 rotation drive mechanism
5 welding device
51 welding base
58 roller
6 travel device
61 rail
62 carriage
63 slider drive mechanism
7 movable support column
71 slider
72 support column body
73 groove
74 bar
75 insertion hole
76 cam follower
8 welding unit
81 welding torch
82 welding power supply
83 shielding gas source
84 filler metal supply device
85 welding controller
851 welding condition control section
852 welding position control section
88 cooling water circulation device
9 stand
91 Z-axis movement mechanism (vertical movement mechanism)
92 Y-axis movement mechanism (horizontal movement mechanism)
93 shield box
932 groove

The invention claimed is:

1. A weld overlay system which weld overlays an outer peripheral surface of a workpiece of a circular tube shape, the weld overlay system comprising:
   a workpiece jig which holds the workpiece in such a manner that a center axis direction of the workpiece conforms to a first direction, and rotates the workpiece in a circumferential direction thereof;
   a carriage which moves in the first direction along the workpiece held by the workpiece jig;
   a welding base disposed above the workpiece and supported on the carriage in such a manner that the welding base is displaceable with respect to the carriage in a second direction perpendicular to the first direction and in a third direction perpendicular to the first direction and the second direction;
   at least one pair of rollers, each roller of the at least one pair of rollers having a rotary shaft that extends in parallel with the first direction, the pair of rollers being supported on the welding base in such a manner that the rotary shafts of the pair of rollers are spaced apart from each other in the second direction, and the pair of rollers are pressed against the outer peripheral surface of the workpiece by a gravitational force to maintain a distance between the welding base and the workpiece at a constant value;
   a welding torch supported on the welding base in such a manner that a tip end of the welding torch is positioned between the rotary shafts of the pair of rollers in the second direction;
   a horizontal movement mechanism provided between the carriage and the welding base and including a rail extending in a horizontal direction and a slider which travels on the rail, the horizontal movement mechanism being configured to cause to move the welding base to be displaceable in the horizontal direction with respect to the carriage; and
   a vertical movement mechanism provided between the carriage and the welding base to move and configured to cause the welding base to be displaceable in a vertical direction with respect to the carriage, wherein the vertical movement mechanism includes a slider shaft extending in the vertical direction, a first base to which the slider shaft is fastened, a second base which is slidable on the slider shaft, and an elastic member provided between the first base and the second base.

2. The weld overlay system according to claim 1, further comprising:
   a shield box which covers the tip end of the welding torch; and
   a shielding gas source which supplies a shielding gas to the shield box.

3. The weld overlay system according to claim 1,
wherein the welding torch includes a non-consumable electrode, the weld overlay system further comprising:
   a torch jig which holds the welding torch; and
   an AVC unit which includes a slider to which the torch jig is mounted, a rail on which the slider travels, and a motor that drives the slider, the AVC unit moving the torch jig in the third direction with respect to the welding base to maintain an arc length between the non-consumable electrode and a base metal at a constant value.

4. The weld overlay system according to claim 1,
wherein the pair of rollers are mounted to the welding base in such a manner that a distance in the second direction between the rotary shafts of the pair of rollers is changeable.

5. The weld overlay system according to claim 1,
wherein the pair of rollers include a first pair of rollers and a second pair of rollers which are disposed on both sides of the welding torch in the first direction, and
wherein the first pair of rollers are pressed against the outer peripheral surface of the workpiece which is not yet weld overlaid and the second pair of rollers are pressed against the outer peripheral surface of the workpiece which has been weld overlaid.

* * * * *